United States Patent

Hwang et al.

[11] Patent Number: 5,941,950
[45] Date of Patent: Aug. 24, 1999

[54] SOCKET BINDING METHOD IN COMMUNICATION SYSTEM USING SOCKET FUNCTION

[75] Inventors: Yeong-Gil Hwang, Seoul; Soo-Hyun Kim, Goyang; Jong-Hoon Kim, Seoul, all of Rep. of Korea

[73] Assignee: Samsung Electronics, Co., Ltd., Kyungki-do, Rep. of Korea

[21] Appl. No.: 08/954,618

[22] Filed: Oct. 20, 1997

[30] Foreign Application Priority Data

Nov. 7, 1996 [KR] Rep. of Korea ........................ 96-52637

[51] Int. Cl.[6] ...................................................... G06F 11/00
[52] U.S. Cl. ............................ 709/227; 709/220; 709/300; 709/305; 710/100
[58] Field of Search ............................ 395/200.5, 200.57, 395/680, 685, 280; 709/220, 227, 300, 305; 710/100

[56] References Cited

FOREIGN PATENT DOCUMENTS

| 0 613 274 A2 | 8/1994 | European Pat. Off. ........ H04L 29/06 |
| 2232 855 | 12/1990 | United Kingdom ............ H04L 12/40 |
| 2259 387 | 3/1993 | United Kingdom ............. H04L 5/00 |
| WO 95/08903 | 3/1995 | WIPO ............................. H04Q 11/04 |

*Primary Examiner*—Zarni Maung
*Assistant Examiner*—Saleh Najjar
*Attorney, Agent, or Firm*—Dilworth & Barrese

[57] ABSTRACT

A computer network system includes a network program for establishing an inter-system communication between clients and the server by using a socket function. If a 'bind ( )' system call results in failure in the course of making the inter-system communication by using the socket function, the 'bind ( )' system call is retried after a lapse of a predetermined time. The predetermined time is a time determined based on a time delay in closing the abnormal socket.

8 Claims, 4 Drawing Sheets

SOCKET BINDING METHOD IN COMMUNICATION SYSTEM USING SOCKET FUNCTION

BACKGROUND OF THE INVENTION

1. Field of the Invention

The present invention relates to inter-system communication in computer networks, and more particularly to a method for establishing communication by using a socket function in a network program.

2. Description of the Related Art

In order to establish inter-system communication in a computer network, a network program is generally used. The network program establishes communication by using a socket function which assigns sockets to each communication task. For example, a 'bind ( )' system call is commonly used for assigning the socket.

Referring to FIG. 1, a computer network system which uses the 'bind ( )' system call includes a server 10 and a plurality of clients 12 connected to the server 10. The server 10 is an independent computer system for processing job requests from clients 12. The clients 12 are also independent computer systems for requesting the server 10 to process a particular job. The inter-system communication between server 10 and the clients 12 is managed by a network program contained on both the server 10 and clients 12. In order to establish communication between server 10 and any one of clients 12, a socket function in the network program is used, and a socket is assigned to the specific communication task.

A prior art method for assigning a socket, by using the socket function in the network program, is illustrated in FIGS. 2 and 3. FIGS. 2 and 3 illustrate flow charts representing the process of assigning the socket by using the 'bind ( )' system call (hereinafter, referred to as socket binding), with a connection-oriented protocol, and a connectionless protocol, respectively.

Referring to FIG. 2, with respect to a process for socket binding of a connection-oriented protocol, the server 10 and the client 12 specify a communication protocol type at steps 201 and 211, respectively [socket ( )]. The server 10 assigns a unique name to an unnamed socket at step 202 [bind ( )]. The server 10 notifies client 12 it is ready to accept a connection from the client, at step 203 [listen ( )], and waits to accept a substantial connection from the client 12, at step 204 [accept ( )]. In the meantime, client 12 establishes a connection to the server 10 by using a socket descriptor at step 212 [connect ( )], and writes the request data by using the socket descriptor designated by the socket ( ), at step 213 [write ( )]. Server 10 reads the request data by using the socket descriptor designated by the socket ( ) at step 205 [read ( )], and thereafter executes the process according to the data request. Once executed, server 10 writes reply data according to the process execution at step 206 [write ( )]. Client 12 then reads the reply data from server 10, at step 214 [read ( )].

Next, referring to FIG. 3, with respect to the process for socket binding of a connectionless protocol, server 10 and client 12 specify a communication protocol type at steps 301 and 311, respectively [socket ( )]. The server 10 and the client 12 assign a unique name to an unnamed socket at steps 302 and 312, respectively [bind ( )]. The client 12 then sends the request data by using the socket descriptor designated by the socket ( ), at step 313 [sendto ( )]. Server 10 receives the request data from client 12 by using the socket descriptor designated by the socket ( ), at step 303 [recvfrom ( )], and upon receipt, server 10 executes the process according to the request. Thereafter, the server 10 sends the reply data corresponding to the data request, at step 304 [sendto ( )]. Client 12 receives the reply data from the server 10 at step 314 [recvfrom ( )].

If the 'bind ( )' system call results in failure when assigning a unique name to an unnamed socket, the 'bind ( )' system call will be retried immediately. However, if the 'bind ( )' system call is repeatedly retried and continues to fail, a time delay is caused and a system call error will be generated during the time delay. The prior art method repeatedly retries the system call in case of system abnormalities. This retrying unnecessarily wastes system resources as well as increasing the load on the system.

SUMMARY OF THE INVENTION

It is therefore an object of the present invention to provide a method for removing a repeated system call in case of a detected abnormality when establishing inter-system communication by using a socket function.

It is another object of the present invention to provide a method for avoiding the waste of system resources in establishing inter-system communication by using a socket function.

It is still another object of the present invention to provide a method for preventing an increase of load on the system when establishing an inter-system communication by using a socket function.

According to an illustrative embodiment of the present invention, a socket binding method for use in inter-system communications using socket functions, delays the time at which the 'bind ( )' system call is retried when a 'bind ( )' system call results in failure. The retry operation is not performed immediately after failure, but only after a lapse of a predetermined time. The predetermined time based on the time delay by the established system in closing an abnormal socket.

BRIEF DESCRIPTION OF THE DRAWINGS

The above and other objects, features and advantages of the present invention will become more apparent in the light of the following detailed description of an exemplary embodiment thereof taken with the attached drawings in which.

DETAILED DESCRIPTION OF PREFERRED EMBODIMENTS

Figure 1:
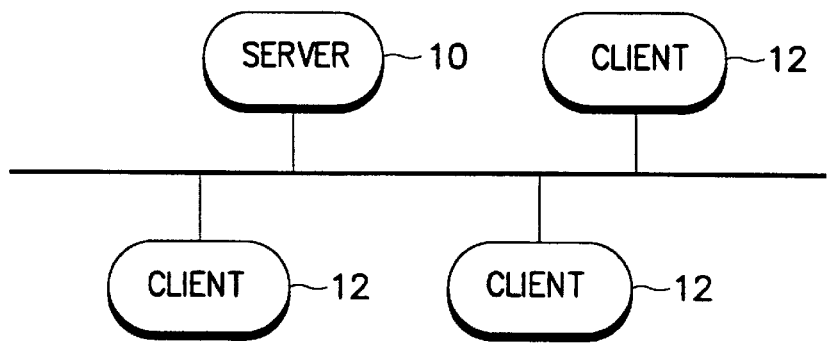
FIG. 1 is a block diagram showing a general computer network system.
Figure 3:
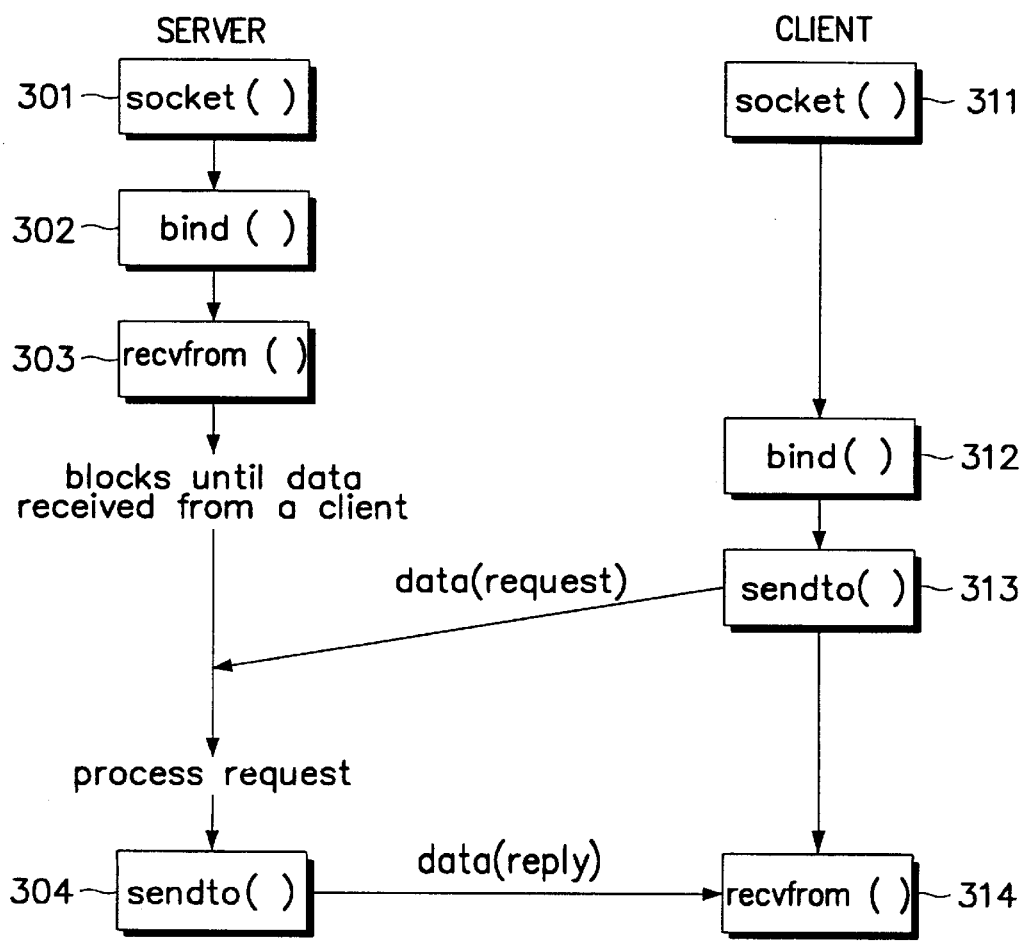
FIG. 3 is a flow chart of the socket binding method of a connectionless protocol according to the prior art.
Figure 2:
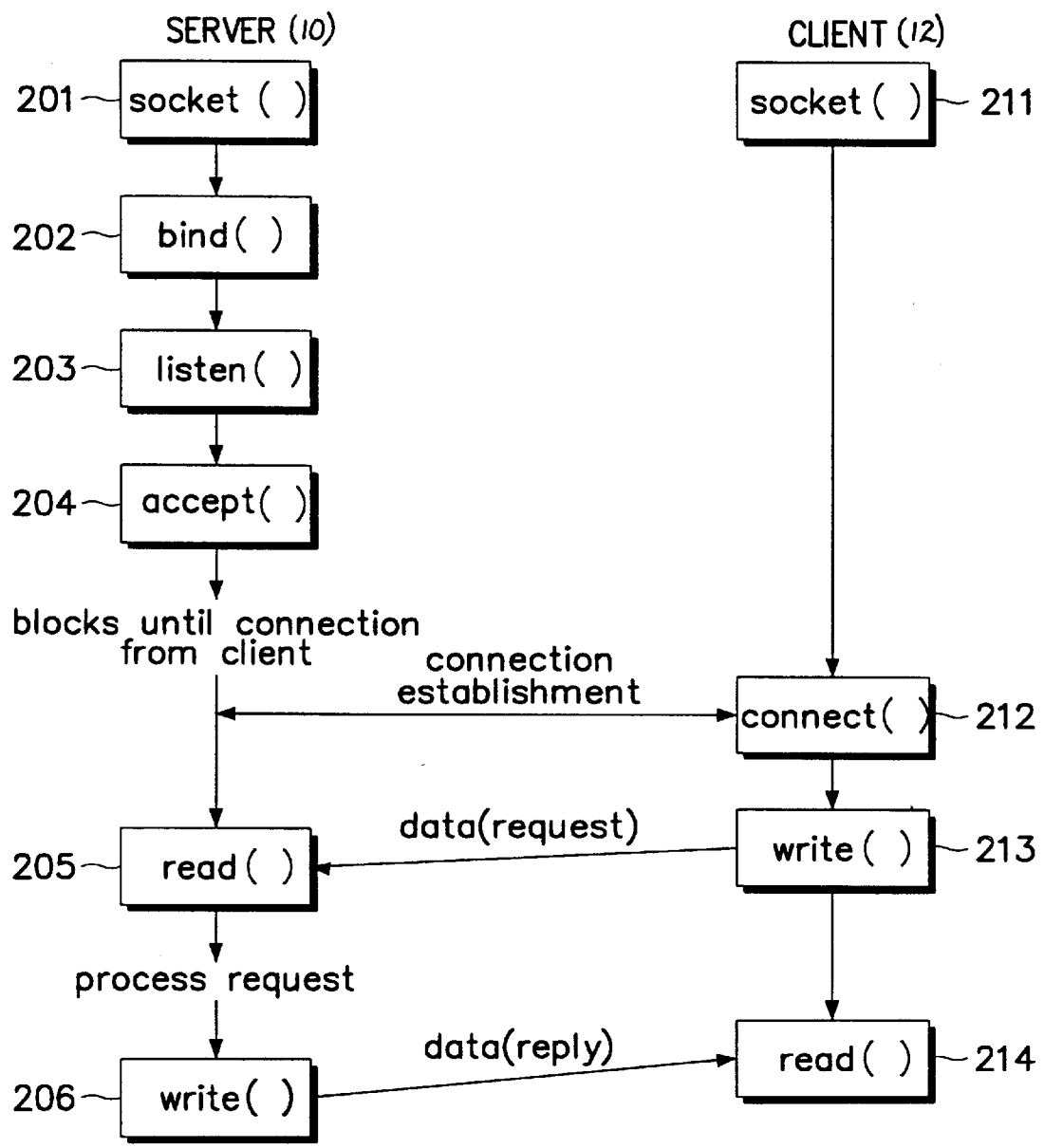
FIG. 2 is a flow chart of the socket binding method of a connection-oriented protocol according to the prior art.

An embodiment of the present invention will be described in detail hereinbelow with reference to the attached drawings, in which the like reference numerals represent the like elements. Further, it should be clearly understood that many specifics such as the detailed circuit elements are shown only by way of an example to bring a better understanding of the present invention and the present invention may be embodied without the specifics. Moreover, it should be noted that detailed descriptions on the related prior art may be intentionally omitted if it is believed to be unnecessary in describing the concepts of the present invention. The terms used in the specification are defined in due consideration of the functions of the invention and are replaceable according to a usual practice or an intention of the user or chip designer. Preferably, the terms shall be defined based on the contents described throughout the specification.

Figure 4:
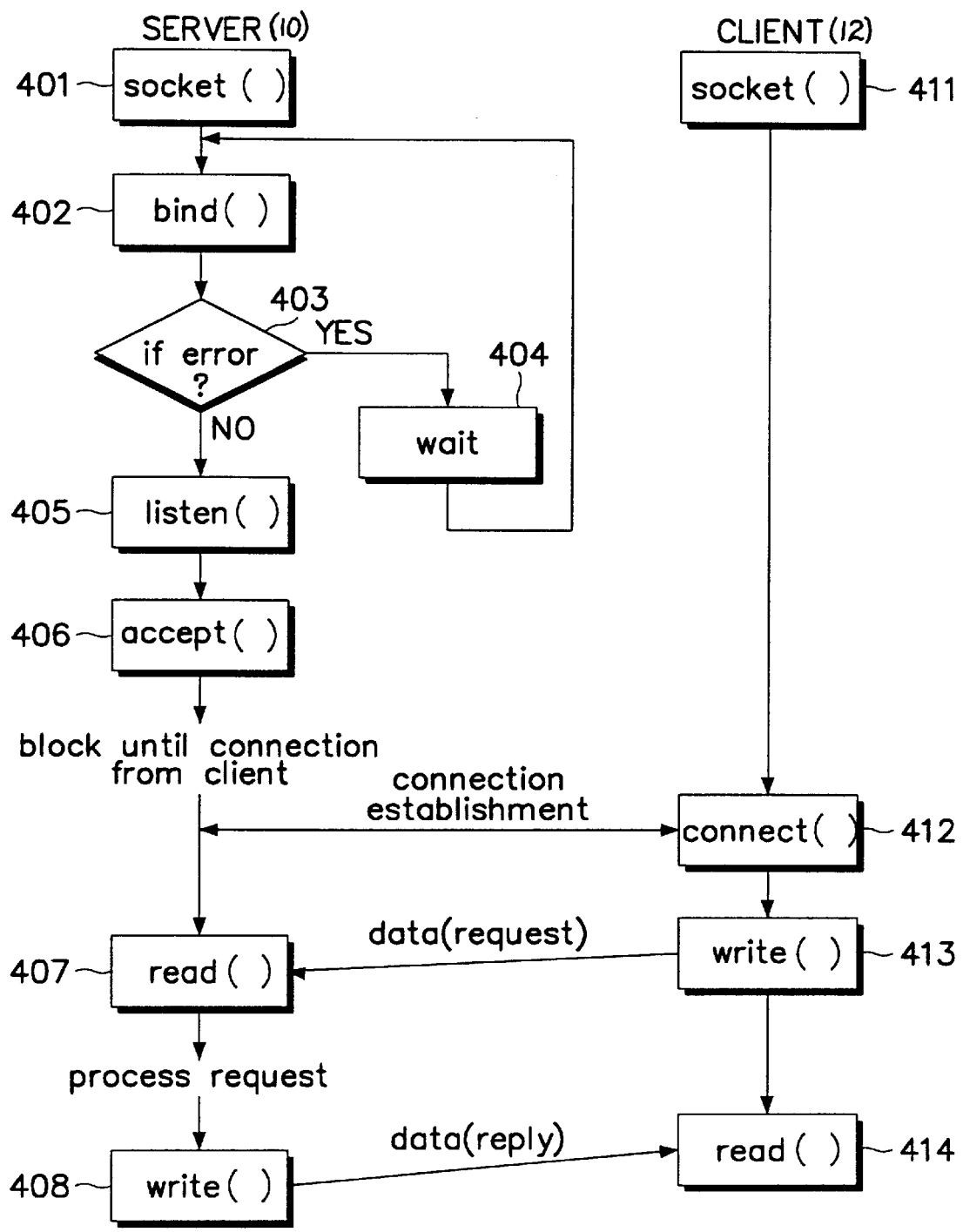
FIG. 4 is a flow chart of the socket binding of a connection-oriented protocol according to an illustrative embodiment of the present invention.
Figure 5:
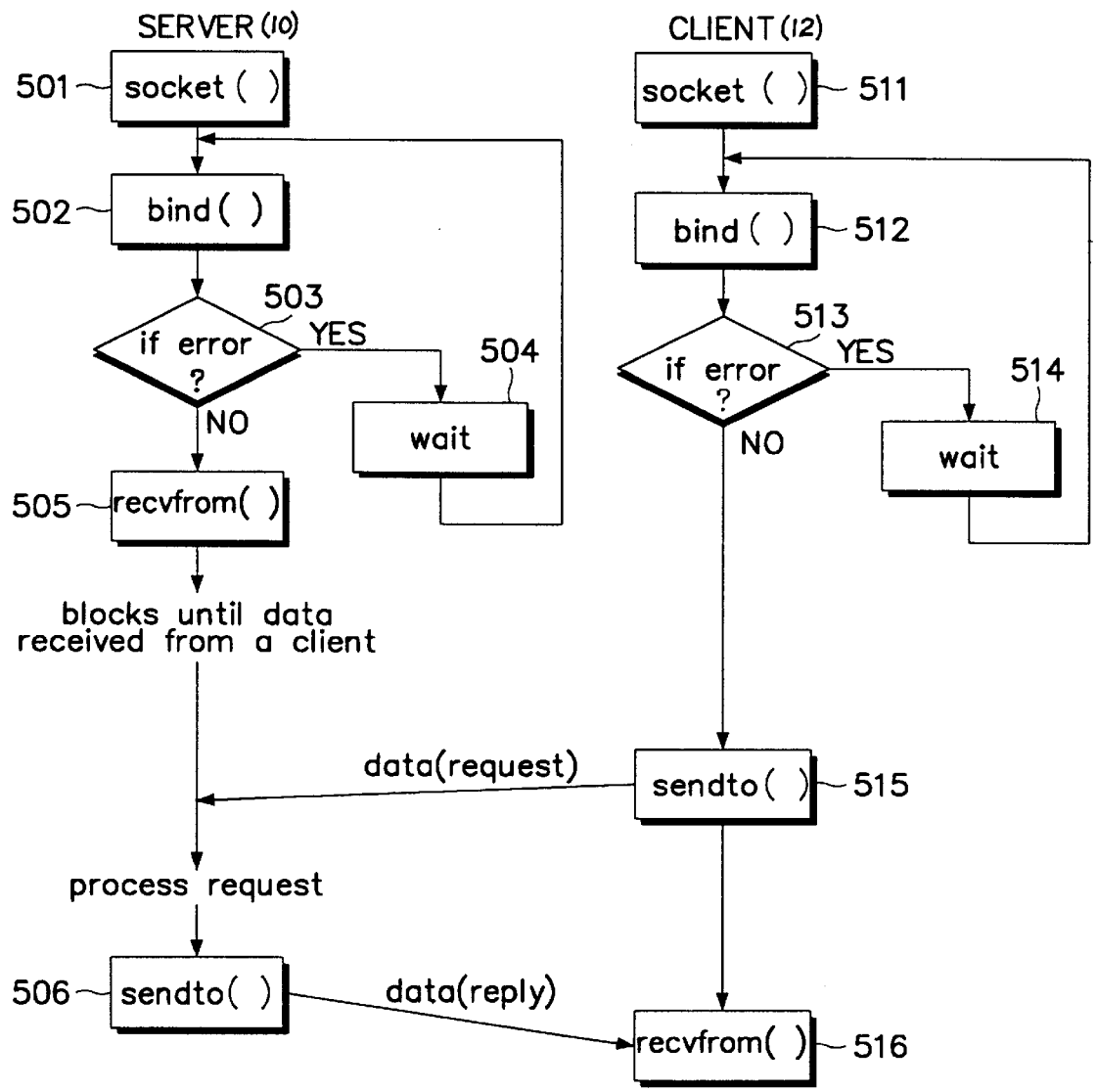
FIG. 5 is a flow chart of the socket binding of a connectionless protocol according to another illustrative embodiment of the present invention.

A socket binding method according to the invention will be described in detail hereinbelow with reference to FIGS. 4 and 5, in which FIG. 4 illustrates a flow chart for a socket binding of a connection-oriented protocol, and FIG. 5 illustrates a flow chart for a socket binding of a connectionless protocol. The socket binding method is characterized in that when the 'bind ( )' system call results in failure, the 'bind ( )' system call will not be immediately retried, but is retried after a lapse of a predetermined time, which is determined based on a time delay (i.e., a time delay in closing the abnormal socket) by the system itself.

Referring to FIG. 4, the server 10 and the client 12 specify a communication protocol type at steps 401 and 411, respectively [socket ( )]. The server 10 assigns a unique name to an unnamed socket at step 402 [bind ( )], and checks, at step 403, whether the 'bind ( )' system call results in success or failure. If the 'bind ( )' system call is successful, server 10 will go to step 405. Otherwise, if the 'bind ( )' system call fails, server 10 will go to step 404 to wait for a predetermined time and thereafter will return to the step 402 to retry the 'bind ( )' system call. The predetermined time refers to the time delay by the system itself, i.e. the time delay is closing the initially abnormal socket.

The server 10 notifies that it is ready to accept a connection from client 12, at step 405 [listen ( )], and waits to accept a substantial connection from the client 12, at step 406 [accept ( )]. Client 12 establishes a connection to the server 10 by using a socket descriptor at step 412 [connect ( )], and writes request data by using the socket descriptor designated by the socket ( ), at step 413 [write ( )]. Then, server 10 reads the request data by using the socket descriptor designated by the socket ( ) at step 407 [read ( )], and executes the process according to the data request. Thereafter, server 10 writes reply data according to the executed process at step 408 [write ( )]. Client 12 reads the reply data from the server 10, at step 414 [read ( )].

Referring to FIG. 5, with respect to the process for a socket binding of a connectionless protocol, server 10 and client 12 specify a communication protocol type at steps 501 and 511, respectively [socket ( )]. The server 10 and the client 12 assign a unique name to an unnamed socket at steps 502 and 512, respectively [bind ( )]. The server 10 and the client 12 then check whether the 'bind ( )' system call results in success or failure, at steps 503 and 513, respectively. If the 'bind ( )' system call is successful, server 10 and client 12 will go to steps 505 and 515, respectively. Otherwise, if the 'bind ( )' system call fails, server 10 and client 12 will go to steps 504 and 514 respectively, to wait for a predetermined time and thereafter will return to the steps 502 and 512 respectively, to retry the 'bind ( )' system call. Here, the predetermined time refers to the time delay by the system itself, as mentioned above.

If the 'bind ( )' system call is successful at step 513, client 12 will send the request data by using the socket descriptor designated by the socket ( ), at step 515 [sendto ( )]. Further, if the 'bind ( )' system call is successful at step 503, server 10 will receive the request data by using the socket descriptor designated by the socket ( ), at step 505 [recvfrom ( )]. Upon receiving the request data from client 12, server 10 executes the process according to the data request. Thereafter, server 10 sends the reply data corresponding to the data request, at step 506 [sendto ( )]. Then, client 12 receives the reply data from server 10 at step 516 [recvfrom ( )].

As described in the foregoing, when the 'bind ( )' system call attempt fails, the 'bind ( )' system call will be retried only after a lapse of the predetermined time. Therefore, it is possible to avoid waste of the system resources and an increase of the load.

Although preferred embodiments of the present invention has been described in detail hereinabove, it should be clearly understood that many variations and/or modifications of the basic inventive concepts herein taught which may appear to those skilled in the art will still fall within the spirit and scope of the present invention as defined in the appended claims.

What is claimed is:

1. A method for assigning a socket when establishing inter-system communication on a computer network using a socket function, the method comprising the steps of:
   integrating a time delay into a socket assignment process;
   activating the time delay in response to a failed socket assignment attempt; and
   retrying the socket assignment after the lapse of the time delay.

2. The method according to claim 1, wherein said time delay is determined based on a system time delay in closing an abnormal socket.

3. The method according to claim 1, wherein said steps of integrating, activating and retrying are performed in a connection-oriented protocol system.

4. The method according to claim 1, wherein said steps of integrating, activating and retrying are performed in a connectionless protocol system.

5. A socket binding method for use in establishing inter-system communication using a socket function, the method comprising the steps of:
   detecting a failure in a 'bind ( )' system call; and
   retrying the 'bind ( )' system call after the lapse of a predetermined time.

6. The method according to claim 5, wherein said predetermined time is determined based on a system time delay in closing an abnormal socket.

7. The method according to claim 5, wherein said steps of detecting and retrying are performed in a connection-oriented protocol system.

8. The method according to claim 5, wherein said steps of detecting and retrying are performed in a connectionless protocol system.

* * * * *